Patented July 10, 1951

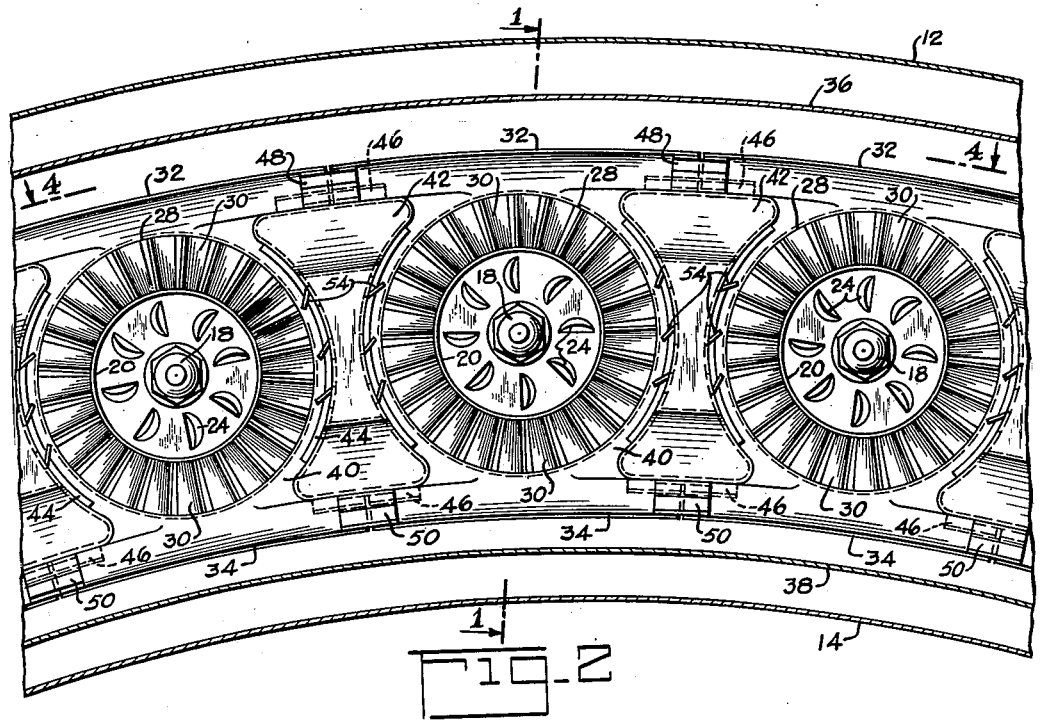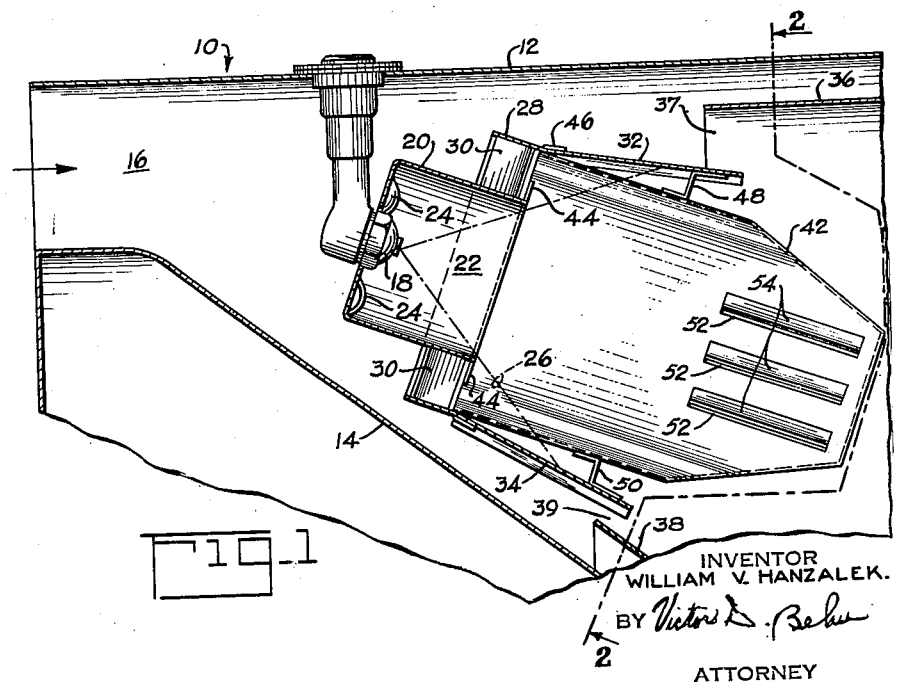

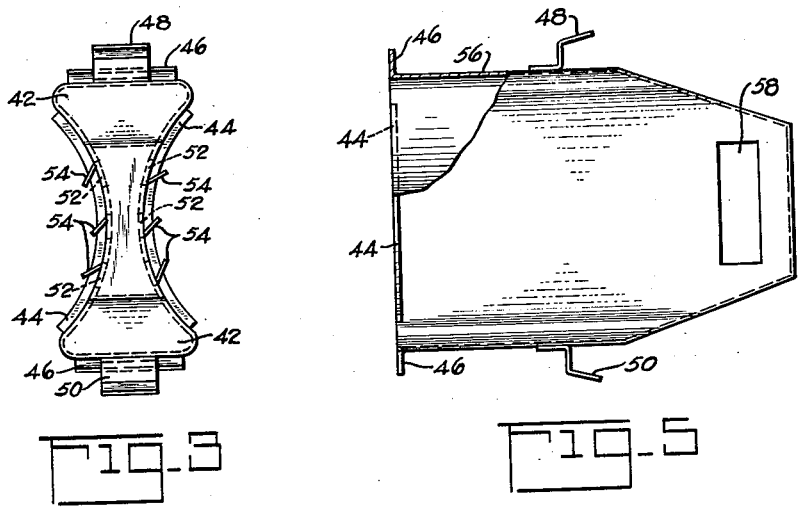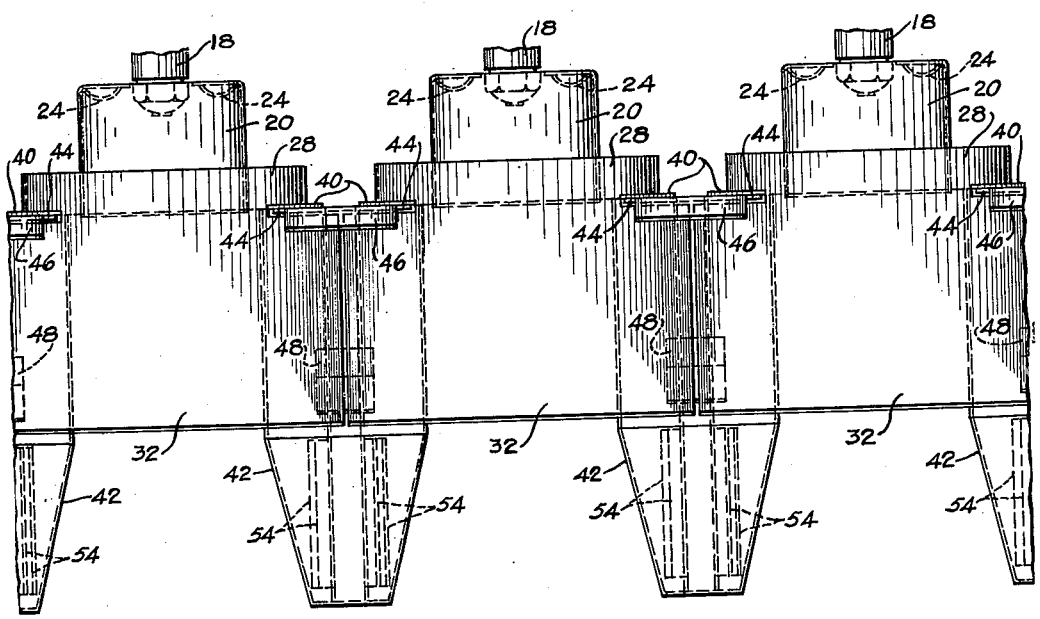

2,560,223

UNITED STATES PATENT OFFICE 2,560,223

DOUBLE AIR-SWIRL BAFFLE CONSTRUCTION FOR FUEL BURNERS

William Vincent Hanzalek, New York, N. Y., assignor to Wright Aeronautical Corporation, a corporation of New York Application February 4, 1948, Serial No. 6,140

8 Claims. (Cl. 60—44)

1

This invention relates to combustion chamber structure and is particularly directed to means for mixing of fuel and combustion air in said chamber and to means for mixing the combustion gases with secondary or cooling air.

In a continuously burning combustion chamber for an engine—such as a gas turbine—considerable excess air must be mixed with the burned mixture in the combustion chamber in order to reduce the high temperature of the combustion gases. Thus, at full power operation of a gas turbine, approximately four times more air than is necessary for complete combustion may be supplied to the turbine combustion chamber. At low power operation of the gas turbine, the air supplied to the turbine combustion chamber may be more than ten times the quantity needed for complete combustion. It is not possible to mix all this air with the fuel in the zone of initial or primary combustion because the resulting fuel-air mixture would be much too lean for combustion. Accordingly, only a portion of the air is mixed with the fuel in the zone of initial combustion. An object of this invention comprises the provision of a novel burner structure including means for mixing air with the combustion gases.

Specially the invention comprises a burner structure in which a duct extends downstream from the zone of initial combustion and air is supplied through said duct and introduced laterally therefrom into the combustion gases from the downstream end of said duct. With this arrangement, said laterally directed air is used to control the temperature variation of the combustion gases across the combustion chamber.

Other objects of the invention will become apparent upon reading the annexed detailed description in connection with the drawing, in which:

Figure 1 is an axial sectional view through a combination combustion chamber and burner structure embodying the invention, said section being taken along line 1—1 of Figure 2;

Figure 2 is a sectional view taken along line 2—2 of Figure 1;

Figure 3 is an end view of one of the inter-burner baffle duct members as viewed from its downstream end;

Figure 4 is a developed view taken along line 4—4 of Figure 2; and

Figure 5 is a side view of a modified form of the inter-burner air baffle.

Referring to Figures 1 and 2 of the drawing, reference numeral 10 designates a combustion chamber embodying the invention, said combustion chamber having been designed for use in a conventional gas turbine power plant in which compressed air is supplied to the combustion chamber by a compressor drivably connected to the turbine rotor. Such a gas turbine power plant is schematically illustrated in copending application Serial Number 6,194, filed February 4, 1948, by Berggren et al. Obviously, however, the invention is not limited to this specific application.

As illustrated, the combustion chamber 10 comprises an outer annular shell 12 and an inner annular shell 14. Compressed air is supplied to the combustion chamber through an annular intake passage 16 and a plurality of fuel nozzles 18 are circumferentially spaced about said combustion chamber intake passage. As illustrated, each fuel nozzle 18 is supported from the outer shell 12 of the combustion chamber and said nozzles are arranged to discharge fuel in a diverging conical spray in the general direction of the air flow into and through said combustion chamber. A cylindrical burner member 20 is co-axially disposed about each fuel nozzle 18 and extends a substantial distance downstream from each such nozzle to form a chamber 22 in which combustion is initiated. The upstream end of each cylindrical burner member 20 comprises an air baffle which closes the upstream end of said member to air flow therein except for the restricted air flow path provided by openings formed in said end by air baffles 24 pushed out from each said ends. Suitable igniter means (not shown) are provided for ignition of the combustion mixture in the burner chambers 22. Said igniter means may comprise conventional electric spark gaps.

The fuel nozzles 18 are conventional, each having a diverging conical spray pattern as indicated by the dot-and-dash lines 26 in Figure 2. The cylindrical burner members 20 extend downstream as far as possible from their respective nozzles without intercepting the fuel spray from said nozzles. That is, each burner chamber 22 is made as deep as possible without having its fuel spray strike the relatively cool walls of said chamber.

The air baffles 24 are directed so as to impart a whirling motion to the air entering therethrough into each burner chamber 22 thereby providing some mixing of said air with the fuel sprayed from the nozzle 18 for said chamber. As illustrated the air baffles 24 are disposed so as to cause a clockwise whirling motion, about the axis of its fuel nozzle as viewed in Figure 2, of the air entering each burner chamber 22.

A second cylindrical burner member 28 is co-axially disposed about each cylindrical burner member 20 and circumferentially spaced vanes or baffles 30 are secured therebetween. The baffles 30 are disposed so as to cause a whirling motion of the air discharging therefrom in the opposite rotative direction from that caused by the associated baffles 24. Thus as viewed in Figure 2, the baffles 24 cause a clockwise rotation of the air entering the burner chamber 22 while the baffles 30 cause a counterclockwise rotation of the air supplied between the burner members 20 and 28, thereby providing a double air-swivel burner construction. For reasons of clarity only one burner structure is illustrated in Figure 1.

With the above construction fuel is sprayed into each burner chamber 22 from its nozzle 18 in a diverging conical spray. The cone angle of said fuel spray pattern and the length of the burner chamber 22 being such that said spray just clears the downstream edge of said chamber. A small quantity of air enters each chamber 22 through small openings, provided by the baffles 24, in the upstream end of said chamber, said air being caused to whirl about the axis of its chamber by the baffles 24 thereby causing some mixing of the fuel and air in said chamber. Also, the cross-sectional area of the openings provided by the baffles 24 is sufficiently small compared to the cross-sectional area of the chambers that axial velocity of flow through said chambers is low. Actually the quantity of air thus supplied to each burner chamber 22 is much less than that required for complete combustion of the fuel. For example in a particular gas turbine power plant only about 8% of the air required for complete combustion of the fuel, at rated engine power, is so supplied to the burner chambers 22. Accordingly, each burner chamber 22 forms a relatively shielded region for initiation of combustion therein. Because only a small percentage of the total combustion chamber air is supplied directly to the shielded burner chambers 22, the rate of fuel flow can be reduced to a relatively low value, for low power outputs, without danger of the flame blowing out.

The whirling motion of the air entering each burner chamber 22 is imparted to the burning and combustion gases therein and, at the downstream end of each chamber 22, said gases mix with oppositely whirling air flowing between the associated cylindrical burner members 20 and 28. The air flow path between the burner members 20 and 28 is sufficiently large, in cross-sectional area, that the quantity of air flowing therebetween together with the air entering the burner chamber 22 directly, is at least substantially equal to that necessary for complete combustion of the fuel. The mixing of these oppositely whirling gas masses produces considerable turbulence downstream in the cylindrical burner members 20 and 28 thereby facilitating mixing and burning of said gases.

Each cylindrical burner member 28 also has an extension 32 extending downstream therefrom, said extension being rigid with the portion of said member adjacent the outer shell 12 of the annular combustion chamber 10 and comprising a cylindrical section co-axial with the axis of said chamber. Each said cylindrical extension 32 subtends a sufficient angle about the axis of the annular combustion chamber 10 so that its circumferentially spaced ends substantially abut the corresponding ends of the adjacent extensions 32 thereby forming an annular flame shield. The portion of each cylindrical burner member 28 adjacent the inner shell 14 of the combustion chamber 10 is provided with an extension 34 formed rigid with said member 28 and similar to the extension 32 to form a second annular flame shield.

The outer shell 12 of the combustion chamber 10 is provided with an annular liner 36 disposed adjacent thereto and overlapping the annular shield formed by the extensions 32. Similarly the inner shell 14 of the annular combustion chamber 10 is provided with an annular liner 38 overlapping the annular shield formed by the extensions 34.

Additional or secondary air is supplied to the combustion chamber through the spaces between adjacent burner members 28 and through the annular spaces 37 and 39 respectively formed between the annular combustion chamber liners 36 and 38 and the adjacent flame shields 32 and 34. The turbulence of the gases discharging from the burner members 20 and 28 facilitates mixture therewith of said secondary air. The structure so far described is generally similar to that disclosed in said aforementioned copending application.

A pair of flanges 40, formed on each cylindrical burner member 28, provide for attachment of suitable ducts 42 between adjacent cylindrical burner members 28. As illustrated in Figures 2 and 3, each duct 42 has an hour-glass-like cross-section and its open upstream end fits the inter-burner spaces through which additional or secondary air is supplied to the combustion chamber. Side flanges 44 are formed on the upstream end of each duct 42 for securement to the flanges 40 on the adjacent cylindrical burner members 28—as for example by welding. As a further support, the upstream ends of the ducts 42 are provided with flanges 46 at the radially inner and outer portions of said ends, said flanges being bent around the adjacent upstream ends of the extensions 32 and 34 after said ducts are disposed in position between said extensions. Brackets 48 and 50 are also provided for further securing the ducts 42 to the burner extensions 32 and 34 respectively.

The downstream end of each duct 42 is closed except for side openings 52. As illustrated, each side opening 52 is formed by a tab 54 struck out from the side of its duct 42, said tabs being inclined so as to direct air laterally into the gases discharging from the pairs of burner members 20 and 28 and against the direction of rotation of the adjacent outer layer of gases discharging from the baffles 30. That is, each duct 42 with its closed downstream end, side openings 52 and tabs 54 constitutes an air baffle arrangement for conducting fresh air between the burners to a point downstream therefrom and directing said air laterally into the turbulent gases discharging from the burners. The turbulence of the combustion gases discharging from the burner members 20 and 28 facilitates mixture therewith of the air directed laterally therein by the combination duct 42 and its baffle end.

The baffle-ducts 42 are obviously not limited to use with the double air-swirl construction. Thus, said baffle-ducts 42 may be used with the usual single air-swirl construction or with any means for producing turbulence of the burning mixture for combustion gases. The tabs 54 are disposed so as to direct air against the direction of the swirl produced by the outer air baffles 30 thereby facilitating the mixture of said air with the gas streams discharging from the pairs of cylindrical burner members 20 and 28. However, and particularly because of the large turbulence of said gas stream, satisfactory results have been obtained with a modified baffle-duct 56 (Figure 5) in which the tabs 54 have been eliminated. The baffle-duct 56 is simply provided with a closed downstream end together with side openings 58 through which air is directed laterally into the flame and combustion gases emanating from each adjacent pair of burner members 20 and 28. Except for the elimination of the tabs 54 and for the shape of the side openings 58, each baffle-duct 56 is otherwise identical to the structure of the baffle-ducts 42 and like parts have been indicated by like reference numerals.

In the absence of the inter-burner baffle-ducts 42 or 56, it has been found that the temperature of the annular exhaust gas stream, as it leaves the annular combustion chamber 10, is non-uniform in that said temperature is a maximum around the mean diameter of said annular stream and said temperature is a minimum around the maximum and minimum diameters of said annular stream. In the case of a gas turbine power plant, this non-uniform temperature distribution of the combustion gases reduces the maximum average temperature of the combustion gases at which the power plant can safely be operated so that the output of said power plant is correspondingly reduced. The baffle-ducts 42 or 56 extend downstream approximately midway between the inner and outer walls of the combustion chamber. Accordingly the air directed laterally from each baffle-duct tends to cool the annular combustion gas stream around its mean diameter with the result that a more uniform temperature of the combustion gases, across the combustion chamber, is achieved thereby permitting the gas turbine power plant to be operated at a higher average combustion gas temperature with a corresponding increase in output.

The air directed laterally by each baffle-duct 42 or 56 actually tends to split the flame emanating from each pair of burner members 20 and 28 into two separate flames, the one directed downstream and toward the radially outer wall of the annular combustion chamber and the other directed downstream and toward the radially inner wall of said annular combustion chamber. Accordingly, by varying the quantity and point or points at which the air is directed laterally into the combustion gases and the flame emanating from each pair of burner members 20 and 28, it is possible to vary the relative magnitude of said resulting two flames in order to obtain a more uniform temperature or other desirable temperature variation across the combustion gases. For example, in a conventional gas turbine power plant in which the turbine rotor blades extend radially from the turbine rotor, the stress in said blades is generally a minimum adjacent their radially outer ends and said stress increases toward their radially inner ends. Accordingly, in this usual construction, the radially outer ends of the turbine blades have a higher maximum safe operating temperature than their radially inner ends and therefore, for maximum output the temperature of the combustion gases preferably is a maximum at the maximum diameter of the annular combustion gas stream discharging from the turbine combustion chamber. With the present construction, this latter temperature distribution can be obtained by arranging the baffle-ducts so that more air is directed laterally into the radially inner portions of the flame and combustion gases emanating from each burner than is directed into the radially outer portions of said flame and combustion gases, thereby cooling said radially inner portions more than said radially outer portions. Accordingly, it is apparent that the baffle-ducts 42 and 56 provide a means for obtaining a desired temperature distribution across the combustion gases.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combustion apparatus: an annular combustion chamber having an annular air entrance passageway; a plurality of circumferentially spaced fuel nozzles in said combustion chamber; air baffle means, one for each of said nozzles, for creating turbulence of the air and combustion gases downstream of said nozzles; and a plurality of ducts each disposed between a pair of adjacent nozzles in the general direction of flow through said combustion chamber and extending downstream of said adjacent nozzles and air baffle means, each of said ducts having its upstream end open to receive air flowing between its adjacent nozzles and air baffle means and having its downstream end arranged to direct air from said duct into the gas streams discharging from said adjacent nozzles and air baffle means.

2. In combustion apparatus: an annular combustion chamber having an annular air entrance passageway; a plurality of circumferentially spaced fuel nozzles in said combustion chamber; air baffle means, one for each of said nozzles, for creating turbulence of the air and combustion gases downstream of said nozzles; and a plurality of ducts each disposed between a pair of adjacent nozzles in the general direction of flow through said combustion chamber and extending downstream of said adjacent nozzles and air baffle means, each of said ducts having its upstream end open to receive air flowing between its adjacent nozzles and air baffle means and having side openings adjacent to its downstream end approximately midway between the adjacent portions of the annular walls of said combustion chamber for directing air laterally from said duct into said combustion chamber.

3. In combustion apparatus: an annular combustion chamber having an annular air entrance passageway; a plurality of circumferentially spaced tubular members disposed in the path of the air supplied through said passageway for air flow through said members; a plurality of main fuel nozzles, one for each of said tubular members for spraying fuel into their respective tubular members, said tubular members extending downstream of their respective nozzles; air baffle means for causing turbulence of the gas streams discharging from said tubular members; and a plurality of ducts each disposed between and substantially parallel to a pair of adjacent tubular members, each of said ducts having its upstream end open to receive air flowing between its adjacent tubular members and having its downstream end arranged to direct air laterally from said duct into the gas streams discharging from said adjacent tubular members.

4. In combustion apparatus: a combustion chamber having an air entrance passageway; a first tubular member disposed in said chamber adjacent to its upstream end for air flow through said member; a fuel nozzle for spraying fuel into said tubular member for combustion with air supplied to said chamber; first air baffle means providing a restricted air flow path into said tubular member, said air baffle means being arranged to impart a whirling motion about the axis of said tubular member to the air entering said member through said flow path; a second tubular member surrounding said first tubular member, the air flowing between said tubular members mixing with the gases flowing from the downstream end of said first tubular member; second air baffle means for imparting a whirling motion to air flowing between said tubular members, said last-mentioned whirling motion being co-axial with but opposite to the rotative direction of said first-mentioned whirling motion whereby considerable turbulence is created in said combustion chamber downstream of said first tubular member; and a duct disposed within said combustion chamber to one side of and substantially parallel to said tubular members, said duct having its upstream end open to receive air and having its downstream end arranged to direct said air laterally from said duct into the gas stream discharging from said tubular members.

5. In combustion apparatus: an annular combustion chamber having an annular air entrance passageway; a plurality of circumferentially spaced first tubular members disposed in said chamber adjacent to its upstream end for air flow through said members; a plurality of fuel nozzles, one for each of said tubular members for spraying fuel into their respective tubular members for combustion with air supplied to said chamber; a plurality of first air baffle means, one for each of said tubular members for providing a restricted air flow path into said tubular members and for imparting a whirling motion about the axes of their respective tubular members to the air entering said tubular members through said flow paths; a plurality of second tubular members, each co-axial with and surrounding one of said first tubular members such that the air flowing between said co-axial pairs of tubular members mixes with the gases discharging from the downstream ends of their respective first tubular members; a plurality of second air baffle means for the air flowing between each co-axial pair of first and second tubular members for imparting to said air a whirling motion co-axial with but opposite to the whirling motion imparted to the air entering their respective first tubular members whereby considerable turbulence is created in said combustion chamber downstream of said first tubular members; and a plurality of ducts each disposed between and substantially parallel to a pair of adjacent second tubular members, each of said ducts having its upstream end open to receive substantially all of the air flowing between its adjacent second tubular members and having its downstream end arranged to direct said air laterally from said duct into the gas streams discharging from the adjacent tubular members.

6. The combination recited in claim 5 in which the downstream end of each of said ducts is provided with side openings disposed approximately midway between the adjacent portions of the annular walls of said combustion chamber for effecting said lateral direction of air.

7. The combination recited in claim 5 in which the downstream end of each of said ducts is provided with side openings and air deflecting means, said air deflecting means directing the air discharging laterally from said duct through said openings against the whirling motion imparted by said second baffle means.

8. In combustion apparatus: an annular combustion chamber having an annular air entrance passageway; a plurality of circumferentially spaced first tubular members disposed in said chamber adjacent to its upstream end for air flow through said members; a plurality of fuel nozzles, one for each of said tubular members for spraying fuel into their respective tubular members for combustion with air supplied to said chamber; a plurality of first air baffle means, one for each of said tubular members for providing a restricted air flow path into said tubular members and for imparting a whirling motion about the axes of their respective tubular members to the air entering said tubular members through said flow paths; a plurality of second tubular members, each co-axial with and surrounding one of said first tubular members such that the air flowing between said co-axial pairs of tubular members mixes with the gases discharging from the downstream ends of their respective first tubular members; a plurality of second air baffle means for the air flowing between each co-axial pair of first and second tubular members for imparting to said air a whirling motion co-axial with but opposite to the whirling motion imparted to the air entering their respective first tubular members whereby considerable turbulence is created in said combustion chamber downstream of said first tubular members; means providing first and second annular shield means forming an annular space therebetween co-axial with the axis of and spaced from the walls of said annular combustion chamber, said first annular shield means extending part-way downstream in said combustion chamber from the radially outer and downstream ends of said second tubular members and said second annular shield means extending part-way downstream from the radially inner and downstream ends of said second tubular members; and a plurality of ducts having their upstream ends open to receive air flowing between said second tubular members and said annular shield means and extending downstream between said annular shield means, said ducts having side openings adjacent their downstream ends for directing air laterally into the gas streams discharging from said first and second tubular members.

WILLIAM VINCENT HANZALEK.

REFERENCES CITED

The following references are of record in the file of this patent:

UNITED STATES PATENTS

| Number | Name | Date |
| --- | --- | --- |
| 2,404,335 | Whittle | July 16, 1946 |

FOREIGN PATENTS

| Number | Country | Date |
| --- | --- | --- |
| 588,086 | Great Britain | May 14, 1947 |